US010743336B2

(12) United States Patent
Blasco Serrano et al.

(10) Patent No.: US 10,743,336 B2
(45) Date of Patent: Aug. 11, 2020

(54) SCHEDULING AND TRANSMITTING CONTROL INFORMATION AND DATA FOR DIRECT COMMUNICATION

(71) Applicant: Telefonaktiebolaget LM Ericsson (publ), Stockholm (SE)

(72) Inventors: Ricardo Blasco Serrano, Espoo (FI); Hieu Do, Järfälla (SE); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 173 days.

(21) Appl. No.: 15/762,127

(22) PCT Filed: Sep. 22, 2016

(86) PCT No.: PCT/SE2016/050891
§ 371 (c)(1),
(2) Date: Mar. 22, 2018

(87) PCT Pub. No.: WO2017/052458
PCT Pub. Date: Mar. 30, 2017

(65) Prior Publication Data
US 2018/0288792 A1 Oct. 4, 2018

Related U.S. Application Data

(60) Provisional application No. 62/222,419, filed on Sep. 23, 2015.

(51) Int. Cl.
*H04W 72/12* (2009.01)
*H04L 5/00* (2006.01)
*H04W 4/40* (2018.01)

(52) U.S. Cl.
CPC ....... *H04W 72/1289* (2013.01); *H04L 5/0053* (2013.01); *H04W 72/1242* (2013.01); *H04W 72/1278* (2013.01); *H04W 4/40* (2018.02)

(58) Field of Classification Search
CPC ......... H04W 72/1289; H04W 72/1242; H04W 72/1247; H04W 72/1263; H04W 72/1278;
(Continued)

(56) References Cited

U.S. PATENT DOCUMENTS

| | | | |
|---|---|---|---|
| 2015/0215903 A1 | 7/2015 | Zhao et al. | |
| 2015/0245334 A1 | 8/2015 | Chang | |
| 2015/0264677 A1 | 9/2015 | He et al. | |
| 2016/0080920 A1* | 3/2016 | Baghel | ................ H04L 67/1044 455/404.1 |

(Continued)

OTHER PUBLICATIONS

3GPP TSG RAN WG1 Meeting #77; Seoul, Republic of Korea; Source: Samsung; Title: Mode 1 resource allocation for D2D broadcast communication (R1-142112)—May 19-23, 2014.
(Continued)

*Primary Examiner* — Paul H Masur
(74) *Attorney, Agent, or Firm* — Patent Portfolio Builders, PLLC

(57) ABSTRACT

A method of indicating resources in periodically occurring resource pools according to some embodiments includes, in a radio communication device, transmitting a scheduling assignment message on a shared medium during a predefined period that is defined for the transmission of scheduling assignment messages, wherein the scheduling assignment message indicates resources in a plurality of the periodically occurring resource pools for transmission of a data message; and transmitting the data message in the identified resources in the plurality of the periodically occurring resource pools. Related radio communication devices are also disclosed.

20 Claims, 12 Drawing Sheets

(58) Field of Classification Search
CPC ......... H04W 4/04; H04W 4/046; H04W 4/40; H04L 5/0053; H04L 5/0064
See application file for complete search history.

(56) References Cited

U.S. PATENT DOCUMENTS

| | | | | |
|---|---|---|---|---|
| 2016/0081108 | A1* | 3/2016 | Tseng | H04W 72/1242 370/329 |
| 2016/0353478 | A1* | 12/2016 | Kim | H04W 72/12 |
| 2016/0360544 | A1* | 12/2016 | Yang | H04L 5/00 |
| 2017/0127413 | A1* | 5/2017 | Guan | H04W 72/0446 |
| 2017/0230939 | A1* | 8/2017 | Rudolf | H04W 92/18 |
| 2017/0347394 | A1* | 11/2017 | Yasukawa | H04W 28/04 |
| 2018/0035308 | A1* | 2/2018 | Nguyen | H04W 76/14 |
| 2018/0035447 | A1* | 2/2018 | Kim | H04W 76/14 |
| 2018/0070371 | A1* | 3/2018 | Shin | H04L 5/0044 |
| 2020/0084738 | A1* | 3/2020 | Nguyen | H04W 56/002 |

OTHER PUBLICATIONS

3GPP TSG RAN WG1 Meeting #82; Beijing, China; Source: LG Electronics; Title: Potential enhancements for PC5-based V2V (R1-154290)—Aug. 24-28, 2015.
3GPP TSG-RAN WG1 Meeting #82; Beijing, China; Source: InterDigital Communications; Title: Support of different priorities for D2D communication (R1-154730)—Aug. 24-28, 2015.
3GPP TSG RAN WG1 Meeting #82bis; Malmo, Sweden; Source: Ericsson; Title: Discussion on V2V Scheduling, Resource Pools and Resource Patters (R1-155909)—Oct. 4-10, 2015.
3GPP TSG RAN WG2 Meeting #91; Beijing, China; Source: Xinwei; Title: QoS control in sidelink communications (R2-153575)—Aug. 24-28, 2015.
3GPP TSG-RAN WG2 Meeting #91; Beijing, China; Source: Qualcomm Incorporated; Title: Priority handling for Sidelink Direct Communication (R2-153729)—Aug. 24-28, 2015.
3GPP TSG-RAN WG2 #91; Beijing, China; Source: InterDigital Communications; Title: Priorities and Pre-emption (R2-153739)—Aug. 24-28, 2015.
PCT International Search Report for International application No. PCT/SE2016/050891—dated Nov. 24, 2016.
3GPP TSG-RAN WG2 #93; Malta; Source: Ericsson; Title: Sidelink Resource Allocation in V2X (Tdoc R2-161566)—Feb. 15-19, 2016.
PCT Written Opinion of the International Searching Authority for International application No. PCT/SE2016/050891—dated Nov. 24, 2016.

* cited by examiner

Transmitting a scheduling assignment message on a shared medium during a predefined period that reserves resources in a plurality of periodically occurring resource pools

172

Transmitting a data message in the reserved resources in the plurality of periodically occurring resource pools

174

Transmitting a scheduling assignment message on a shared medium in a first or second scheduling assignment pool based on a characteristic of the data message whose transmission is being scheduled
180

FIGURE 7A

Transmitting a first scheduling assignment message in a first scheduling assignment pool that is reserved for the transmission of scheduling assignment messages that have a first characteristic
182

Transmitting a second scheduling assignment message in a second scheduling assignment pool that is reserved for the transmission of scheduling assignment messages that have a second characteristic

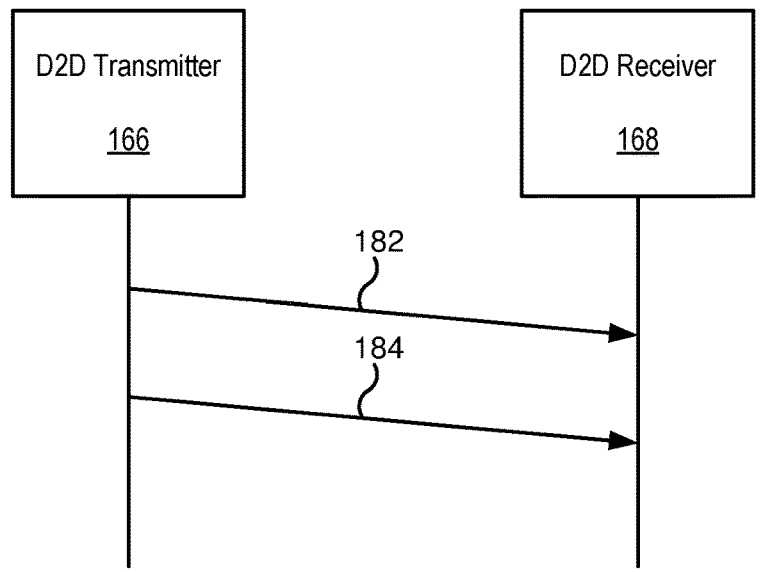

FIGURE 7C

Receiving a first scheduling assignment message in a first scheduling assignment pool that is defined for the transmission of scheduling assignment messages that schedule transmission of data messages having a first characteristic
312

Receiving a second scheduling assignment message in a second scheduling assignment pool that is defined for the transmission of scheduling assignment messages that schedule transmission of data messages having a second characteristic
314

FIGURE 7D

SCHEDULING AND TRANSMITTING CONTROL INFORMATION AND DATA FOR DIRECT COMMUNICATION

RELATED APPLICATION

The present application claims the benefit of and priority to U.S. Provisional Patent Application No. 62/222,419, filed 23 Sep. 2015, entitled "SCHEDULING AND TRANSMITTING CONTROL INFORMATION AND DATA FOR DIRECT COMMUNICATION," the disclosure of which is hereby incorporated herein by reference in its entirety.

PRIORITY

This nonprovisional application is a U.S. National Stage Filing under 35 U.S.C. § 371 of International Patent Application Serial No. PCT/SE2016/050891 filed Sep. 22, 2016, and entitled "Scheduling and Transmitting Control Information and Data for Direct Communication" which claims priority to U.S. Provisional Patent Application No. 62/222,419 filed Sep. 23, 2015, both of which are hereby incorporated by reference in their entirety.

TECHNICAL FIELD

The present disclosure is directed to communications systems and, more particularly, methods, network nodes, user equipment nodes, and systems for performing direct communication between nodes in wireless communications systems.

BACKGROUND

In Release 12, the 3GPP Long Term Evolution (LTE) standard has been extended to support device to device (D2D) communications (specified as "sidelink" communications). D2D communication targets both commercial and public safety applications. The D2D support in Rel-12 LTE enables device discovery, in which devices are able to sense the proximity of other devices and associated applications by broadcasting and detecting discovery messages that carry device and application identities. Another aspect of D2D enables direct communication between devices using physical channels terminated directly by the devices.

One of the potential extensions for the device-to-device functionality consists of support of vehicle-to-anything (V2x) communication, which includes any combination of direct communication between vehicles, pedestrians and/or infrastructure. V2x communication may take advantage of a network infrastructure, when available, but at least basic V2x connectivity may be possible even when network coverage is unavailable. Providing an LTE-based V2x interface may be economically advantageous because of the LTE economies of scale, and because it may enable tighter integration between communications with the network infrastructure (V2I) and vehicle-to-pedestrian (V2P) and vehicle-to-vehicle (V2V) communications, as compared to using a dedicated V2x technology.

An example of an integrated V2X/LTE system is illustrated in FIG. 1. As shown therein, an LTE communication system 100 includes a plurality of radio communication devices, including a radio access node, such as an eNodeB (base station) 110 and a plurality of user equipments (UEs) including pedestrian-borne UEs 120c, 120d and vehicle-borne UEs 120a, 120b, 120e. As used herein, the term "radio communication device" generally refers to any device capable of wireless communication, including user equipment such as mobile terminals, portable terminals, vehicle borne terminals, and fixed terminals, as well as radio network nodes, such as radio access nodes, base stations, repeaters, etc. A radio communication device that is configured for direct communication as described herein may or may not be part of a radio communication network, such as an LTE network.

Some of the UEs, such as UEs 120a-120d are within range of the eNodeB 110 and communicate with the eNodeB 110 using conventional scheduled resources that are allocated by the eNodeB 110, a radio network controller, or other network node. Some of the UEs, including UEs 120a, 120b, 120c and 120e, communicate directly with one another over a D2D network 140 that does not use scheduled resources controlled by the LTE network 100. Rather, the UEs communicate over the D2D network 140 using contention-based resources that are shared among the UEs in the D2D network 140. Note that the UE 120e is out of range of the LTE network 110, and thus cannot communicate directly with the eNodeB 110.

V2x communications may carry both non-safety-related and safety-related information. Each of the applications and services that utilize V2x communications may have specific requirement sets associated with their use of the technology, such as specific requirements for latency, reliability, capacity, etc.

The European Telecommunications Standards Institute (ETSI) has defined two types of messages for road safety: Co-operative Awareness Message (CAM) and Decentralized Environmental Notification Message (DENM).

A CAM message is intended to enable vehicles, including emergency vehicles, to notify other users of their presence and other relevant parameters in a broadcast fashion. Such messages may target other vehicles, pedestrians, and infrastructure, and may be handled by their applications. A CAM message can also serve as active assistance to driving safety for normal traffic. The availability of a CAM message is indicatively checked for every 100 ms, yielding a maximum detection latency requirement of less than 100 ms for most messages. However, the latency requirement for pre-crash sensing warning may be even shorter, e.g., 50 ms.

A DENM message is event-triggered, such as by braking, and the availability of a DENM message is also checked for every 100 ms. The requirement for maximum latency of DENM messages is less than 100 ms.

The package size of CAM and DENM message varies from 100+ to 800+ bytes; the typical size is around 300 bytes. The message is intended to be detected by all vehicles in proximity to the transmitting entity.

The SAE (Society of the Automotive Engineers), another standard setting organization, has defined a Basic Safety Message (BSM) for Dedicated Short-Range Communications (DSRC) with various messages sizes defined.

The BSMs are further classified into different priorities according to the importance and urgency of the messages.

To conform to the Rel 12/13 D2D specification described in 3GPP TS 36.213, it is necessary to transmit a scheduling assignment (SA) packet prior to the transmission of the actual data packet. The SA packet contains information that allows the receiver(s) to find and process the data packet correctly. However, this approach has two major drawbacks: first, it is necessary to dedicate specific resources for broadcasting the SA packets; and second, the latency is increased because it is necessary to decode the SA prior to receiving the data packets in order to obtain the message. Alternative approaches based on blind decoding (i.e., testing all possible control information message hypotheses) of the data packets at the receiving UE result in large computational demands for all but the simplest configurations.

Considering the high peak user capacity targeted by V2X systems, conventional scheduling approaches may incur too much of an overhead cost.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

A method of indicating resources in periodically occurring resource pools according to some embodiments includes, in a radio communication device, transmitting a scheduling assignment message on a shared medium during a predefined period that is defined for the transmission of scheduling assignment messages, wherein the scheduling assignment message indicates resources in a plurality of the periodically occurring resource pools for transmission of a data message; and transmitting the data message in the identified resources in the plurality of the periodically occurring resource pools.

The scheduling assignment message may indicate the same resources in each of the plurality of the periodically occurring resource pools.

The scheduling message may indicate a number of transmissions in the periodically occurring resource pools based on a characteristic of the scheduling assignment message.

The characteristic of the scheduling assignment message may include a resource used for the transmission of the scheduling assignment message.

The scheduling assignment message may specify a number of retransmissions of the data message.

The periodically occurring resource pools may be selected among multiple resource pools, and the selection may be based on characteristics of the data message.

A radio communication device according to some embodiments includes a transceiver including a transmitter and a receiver configured to transmit and receive wireless communications; and a processor coupled to the transceiver. The processor is configured to receive wireless communications through the receiver of the transceiver and to transmit wireless communications through the transmitter of the transceiver. The processor is further configured to perform operations including transmitting a scheduling assignment message on a shared medium during a predefined period that is defined for the transmission of scheduling assignment messages, wherein the scheduling assignment message indicates resources in a plurality of the periodically occurring resource pools for transmission of a data message; and transmitting the data message in the identified resources in the plurality of the periodically occurring resource pools.

A radio communication device according to some embodiments includes a transceiver including a transmitter and a receiver configured to transmit and receive wireless communications; and a processor coupled to the transceiver. The processor is configured to receive wireless communications through the receiver of the transceiver and to transmit wireless communications through the transmitter of the transceiver. The processor is further configured to transmit a scheduling assignment message on a shared medium during a predefined period that is defined for the transmission of scheduling assignment messages, wherein the scheduling assignment message indicates resources in a plurality of periodically occurring resource pools for transmission of a data message; and transmit the data message in the identified resources in the plurality of the periodically occurring resource pools.

Some embodiments provide a radio communication device operating in a telecommunications system. The radio communication device is adapted to transmit a scheduling assignment message on a shared medium during a predefined period that is defined for the transmission of scheduling assignment messages, wherein the scheduling assignment message indicates resources in a plurality of periodically occurring resource pools for transmission of a data message; and transmit the data message in the identified resources in the plurality of the periodically occurring resource pools.

A method of indicating resources in periodically occurring resource pools according to some embodiments includes, in a radio communication device, transmitting a first scheduling assignment message on a shared medium in a first scheduling assignment pool that is defined for the transmission of scheduling assignment messages that schedule transmission of data messages having a first characteristic, wherein the first scheduling assignment message indicates resources in one of the periodically occurring resource pools for transmission of a first data message; and transmitting a second scheduling assignment message on the shared medium in a second scheduling assignment pool that is defined for the transmission of scheduling assignment messages that schedule transmission of data messages having a second characteristic that is different from the first characteristic, wherein the second scheduling assignment message indicates resources in a second of the periodically occurring resource pools for transmission of a second data message.

The characteristic may include a latency requirement and/or a throughput requirement. Moreover, the first scheduling assignment pool may repeat with a first periodicity and the second scheduling assignment pool may repeat with a second periodicity that is different from the first periodicity.

The first scheduling assignment pool may include a first number of transmission resources and the second scheduling assignment pool may include a second number of transmission resources that is different from the first number of transmission resources.

The characteristic may include a latency requirement and the first scheduling assignment pool may be defined for scheduling transmission of data messages requiring low latency. Each of the first scheduling assignment pools may be followed immediately by one of the periodically occurring resource pools.

The periodically occurring resource pools and the first and second scheduling assignment pools may each occupy the same bandwidth and may be separated in time.

The characteristic may include a latency requirement and the first scheduling assignment pool may be defined for scheduling transmission of data messages requiring a latency of 0.5 s or less. The second scheduling assignment pool may be defined for scheduling transmission of data messages requiring a latency greater than 0.5 s.

The first scheduling assignment pool may be defined for the transmission of scheduling assignment messages that identify resources for event-driven data messages and the second scheduling assignment pool may be defined for the transmission of scheduling assignment messages that identify resources for periodic data messages.

The periodically occurring resource pools and the first scheduling assignment pools may each occupy a first bandwidth and be separated in time, and the second scheduling assignment pools may overlap in time with both the periodically occurring resource pools and the first scheduling assignment pools and may occupy a second bandwidth that is different from the first bandwidth.

The second bandwidth may be smaller than the first bandwidth.

The second scheduling assignment pools may overlap in time with a plurality of the periodically occurring resource pools and the first scheduling assignment pools.

The first scheduling assignment pool may be defined for the transmission of scheduling assignment messages that identify resources for event-driven data messages and the second scheduling assignment pool may be defined for the transmission of scheduling assignment messages that identify resources for periodic data messages.

A radio communication device according to some embodiments includes a transceiver including a transmitter and a receiver configured to transmit and receive wireless communications; and a processor coupled to the transceiver. The processor is configured to receive wireless communications through the receiver of the transceiver and to transmit wireless communications through the transmitter of the transceiver. The processor is further configured to perform operations including transmitting a first scheduling assignment message on a shared medium in a first scheduling assignment pool that is defined for the transmission of scheduling assignment messages that schedule transmission of data messages having a first characteristic, wherein the first scheduling assignment message indicates resources in one of the periodically occurring resource pools for transmission of a first data message; and transmitting a second scheduling assignment message on the shared medium in a second scheduling assignment pool that is defined for the transmission of scheduling assignment messages that schedule transmission of data messages having a second characteristic that is different from the first characteristic, wherein the second scheduling assignment message indicates resources in a second of the periodically occurring resource pools for transmission of a second data message.

A radio communication device according to further embodiments includes a transceiver including a transmitter and a receiver configured to transmit and receive wireless communications; and a processor coupled to the transceiver, wherein the processor is configured to receive wireless communications through the receiver of the transceiver and to transmit wireless communications through the transmitter of the transceiver. The processor is further configured to transmit a first scheduling assignment message on a shared medium in a first scheduling assignment pool that is defined for the transmission of scheduling assignment messages that schedule transmission of data messages having a first characteristic, wherein the first scheduling assignment message indicates resources in a first one of a plurality of periodically occurring resource pools for transmission of a first data message; and wherein the processor is configured to transmit a second scheduling assignment message on the shared medium in a second scheduling assignment pool that is defined for the transmission of scheduling assignment messages that schedule transmission of data messages having a second characteristic that is different from the first characteristic, wherein the second scheduling assignment message indicates resources in a second of the plurality of periodically occurring resource pools for transmission of a second data message.

Some further embodiments provide a radio communication device operating in a telecommunications system. The radio communication device is adapted to transmit a first scheduling assignment message on a shared medium in a first scheduling assignment pool that is defined for the transmission of scheduling assignment messages that schedule transmission of data messages having a first characteristic, wherein the first scheduling assignment message indicates resources in a first one of a plurality of periodically occurring resource pools for transmission of a first data message; and transmit a second scheduling assignment message on the shared medium in a second scheduling assignment pool that is defined for the transmission of scheduling assignment messages that schedule transmission of data messages having a second characteristic that is different from the first characteristic, wherein the second scheduling assignment message indicates resources in a second of the plurality of periodically occurring resource pools for transmission of a second data message.

A method of selecting a scheduling assignment pool from a plurality of available scheduling assignment pools for transmission of a scheduling assignment message according to some embodiments includes, on a radio communication device, determining a characteristic of a data message; selecting a scheduling assignment pool from the plurality of available scheduling assignment pools for transmission of a scheduling assignment message in response to the determined characteristic of the data message; and transmitting a scheduling assignment message in the selected scheduling assignment pool, wherein the scheduling assignment message indicates resources in at least one of a plurality of data pools for transmission of the data message.

The scheduling assignment pool may be selected according to a rule.

The available scheduling assignment pools may include first scheduling assignment pools and second scheduling assignment pools, wherein the first scheduling assignment pools are defined for scheduling event-driven data messages and the second scheduling assignment pools are defined for scheduling periodic data messages, and wherein determining the characteristic of the data message may include determining whether the data message is a periodic data message or an event-driven data message.

The available scheduling assignment pools may include first scheduling assignment pools and second scheduling assignment pools, wherein the first scheduling assignment pools have a first latency and the second scheduling assignment pools have a second latency that is larger than the first latency. Determining the characteristic of the data message may include determining a latency requirement of the data message.

The scheduling assignment message may indicate resources in plurality of periodically repeating data pools for transmission of a data message.

Different ones of the plurality of available scheduling assignment pools may be associated with different requirements for transmission of data messages scheduled in the scheduling assignment pools.

The scheduling assignment pools may include first and second scheduling assignment pools and may have a first bandwidth that overlaps with a bandwidth of the plurality of data pools and that are separated in time from the data pools, wherein the first and second scheduling assignment pools have different periodicities.

The scheduling assignment pools may include first and second scheduling assignment pools, wherein the first scheduling assignment pools have a first bandwidth that overlaps with a bandwidth of the plurality of data pools and are separated in time from the data pools, and wherein the second scheduling assignment pools have a second bandwidth that is different from the first bandwidth.

The first bandwidth and the second bandwidth may not overlap. Moreover, the first scheduling assignment pools and the second scheduling assignment pools may have different periodicities.

A radio communication device according to further embodiments includes a transceiver including a transmitter and a receiver configured to transmit and receive wireless communications; and a processor coupled to the transceiver. The processor is configured to receive wireless communications through the receiver of the transceiver and to transmit wireless communications through the transmitter of the transceiver. The processor is further configured to perform operations including determining a characteristic of a data message; selecting a scheduling assignment pool from the plurality of available scheduling assignment pools for transmission of a scheduling assignment message in response to the determined characteristic of the data message; and transmitting a scheduling assignment message in the selected scheduling assignment pool, wherein the scheduling assignment message indicates resources in at least one of a plurality of data pools for transmission of the data message.

A radio communication device according to further embodiments includes a transceiver including a transmitter and a receiver configured to transmit and receive wireless communications; and a processor coupled to the transceiver, wherein the processor is configured to receive wireless communications through the receiver of the transceiver and to transmit wireless communications through the transmitter of the transceiver. The processor is configured to determine a characteristic of a data message, select a scheduling assignment pool from a plurality of available scheduling assignment pools for transmission of a scheduling assignment message in response to the determined characteristic of the data message, and transmit the scheduling assignment message in the selected scheduling assignment pool, wherein the scheduling assignment message indicates resources in at least one of a plurality of data pools for transmission of the data message.

Further embodiments provide a radio communication device operating in a telecommunications system, wherein the radio communication device is adapted to determine a characteristic of a data message; select a scheduling assignment pool from a plurality of available scheduling assignment pools for transmission of a scheduling assignment message in response to the determined characteristic of the data message; and transmit the scheduling assignment message in the selected scheduling assignment pool, wherein the scheduling assignment message indicates resources in at least one of a plurality of data pools for transmission of the data message.

A method according to some embodiments includes, in a radio communication device, receiving a scheduling assignment message on a shared medium during a predefined period that is defined for the transmission of scheduling assignment messages, wherein the scheduling assignment message indicates resources in a plurality of the periodically occurring resource pools for transmission of a data message; and receiving the data message in the identified resources in the plurality of the periodically occurring resource pools.

A method according to some embodiments includes, in a radio communication device, receiving a first scheduling assignment message on a shared medium in a first scheduling assignment pool that is defined for the transmission of scheduling assignment messages that schedule transmission of data messages having a first characteristic, wherein the first scheduling assignment message indicates resources in one of the periodically occurring resource pools for transmission of a first data message; and receiving a second scheduling assignment message on the shared medium in a second scheduling assignment pool that is defined for the transmission of scheduling assignment messages that schedule transmission of data messages having a second characteristic that is different from the first characteristic, wherein the second scheduling assignment message indicates resources in a second of the periodically occurring resource pools for transmission of a second data message.

BRIEF DESCRIPTION OF THE DRAWINGS

FIGS. 7A and 7B are flowcharts and FIG. 7C is a block diagram that illustrate methods of reserving resources in periodically occurring resource pools according to further embodiments.

FIG. 7D is a flowchart that illustrates methods of receiving data messages transmitted in periodically occurring resource pools according to further embodiments.

DETAILED DESCRIPTION

Figure 1:
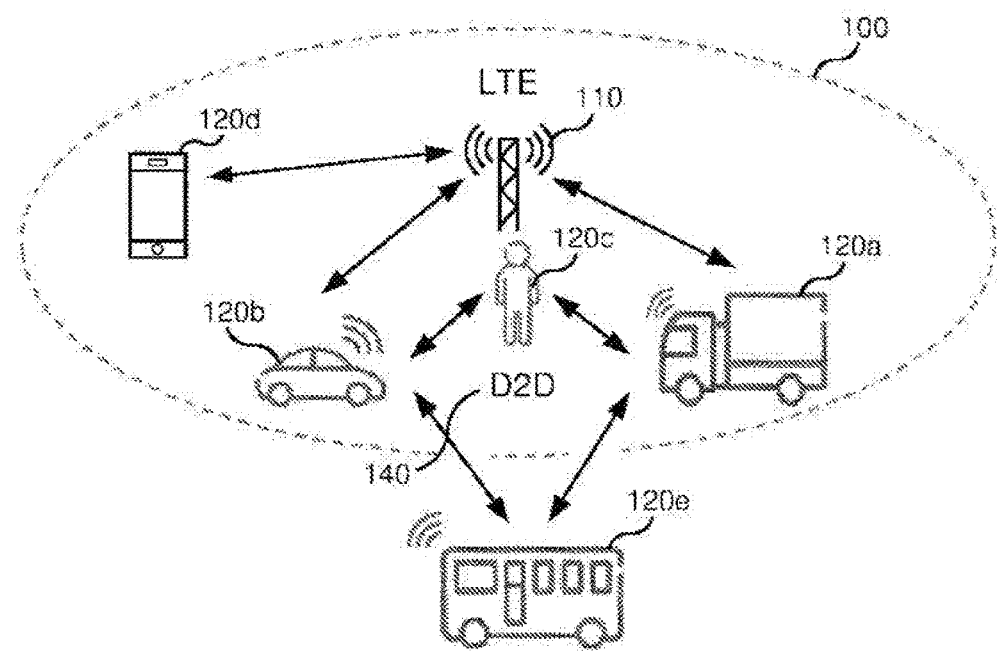
FIG. 1 is a schematic illustration of an integrated V2X/LTE system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete so that those skilled in the art may appreciate the inventive concepts underlying these embodiments. It should also be noted that these embodiments are not mutually exclusive. Components from one embodiment may be tacitly assumed to be present/used in another embodiment.

Various embodiments disclosed herein may overcome one or more of the potential problems explained above with some previously known approaches. Some embodiments define multiple periodically repeating pools of control resources, where different pools repeat with different periodicities. The different pools may also have different maximum capacities. A rule is defined such that control information is transmitted in selected pools based on a characteristic of the control information, such as the urgency of the control information. By doing so, efficient large pools with large periodicity may be used for low priority/high latency control information, while small pools with shorter periodicity can be reserved for occasional urgent control information. Stated differently, some embodiments described herein provide methods of allocating resources to control signal transmissions by nodes that contend for use of a common radio resource. Control signal transmissions use particular pools of resources based on the characteristics of the control signals, such as the latency requirements and/or periodicities of the control signals. Some embodiments described herein may use a smaller amount of overhead for the transmission of scheduling assignments, resulting in correspondingly higher system capacity. Operations associated with example approaches are explained below.

Embodiments of the inventive concepts are described in the context of device-to-device (D2D) communications, which are sometimes referred to as sidelink, peer to peer, or ProSe communications, and in particular in the context of vehicle-to-vehicle (V2V) communications. However, some of the embodiments are applicable to communications among any type of nodes, including uplink communications from some devices to a central control node. Accordingly, embodiments are described herein in terms of communication between user equipments (UEs). However, embodiments of the inventive concepts may apply to communications between UEs and other types of radio network nodes, such as base stations. Some embodiments are particularly applicable to communications systems in which peer devices contend for shared resources, such as media bandwidth, time/frequency resources, etc.

D2D communications are currently under study/standardization as a technology enabler for V2V communication systems. Establishing one-to-many D2D communications is challenging in terms of managing the transmission of control information over a shared medium. In particular, it is necessary that all the decoders/receivers know at least some of the parameters that were used for encoding a data packet (e.g, TF, time-frequency resources, etc.) that is transmitted by an encoder/transmitter.

In one commonly adopted solution, the transmitter explicitly informs all the receivers about the parameters used to transmit the data packet using control information transmitted to the receivers. Using this approach, it is possible to dedicate some special resources for broadcasting control information messages containing the necessary scheduling information (Scheduling Assignments, or SA). That is, each UE may use a special procedure to notify nearby UEs about its intention to transmit using some specified transmission parameters. In LTE Rel-12/13, this is done by defining pools of resources for SA transmission and pools of resources for associated data transmission. The SA indicates the TF resources that will be used by the associated data transmission. SAs use TF resources from the defined pools of resources.

The number of users in a system that transmit control information and/or data at a given time is variable and depends on the traffic load. Furthermore, transmissions by different users or even different transmissions by a given user may have different requirements and/or characteristics in terms of, e.g., maximum acceptable latency, minimum reliability, packet size, etc. For example, for V2V packets, the latency requirements may range from as short as 20 ms to as long as 1 s. As used herein, a "characteristic" of a transmission is a feature or aspect of the transmission, such as a communication resource used for the transmission, a preamble used for the transmission, a periodicity of the transmission, etc. Characteristics of a transmission may also include requirements of the transmission, where a "requirement" is a predetermined condition that the transmission should meet. For example, a transmission of a particular message may have a latency requirement of less than 100 ms, while the actual transmission may have a latency of 80 ms. Both scheduling assignment messages and data messages may have characteristics and requirements.

Multiple users access a common SA pool that needs to be dimensioned to accommodate a sufficient peak number of users with acceptable reliability. For safety applications, such as those associated with V2V, it is important that SA pools are designed to be able to support critical load scenarios in a reliable fashion. When SA pools are designed to account for maximum utilization requirements, the pools may be significantly larger than are required for normal operating conditions, which means that the pools may be underutilized most of the time.

As with payload data, control information also has latency and reliability requirements. For example, the latency and reliability requirements for a given data packet transmission apply naturally even to the control information associated with that transmission. For example, for data that must be transmitted with very low latency, it is important that both the control information and the data itself be transmitted with low latency.

A conventional approach to the problem of allocating resources for control information consists of provisioning periodic control resources (e.g., defining an SA pool) according to the shortest latency requirement of control messages that may be sent, e.g., 50 ms in the V2V case. Similarly, the size of the pool should be dimensioned in order to accommodate the peak capacity in the system. Very often the peak capacity requirements are set by packets with other latency requirements that are larger than the smallest value. This leads to a conservative design that uses large and frequent SA pools, which can consume an unacceptable amount of overhead in the system.

Figure 2:
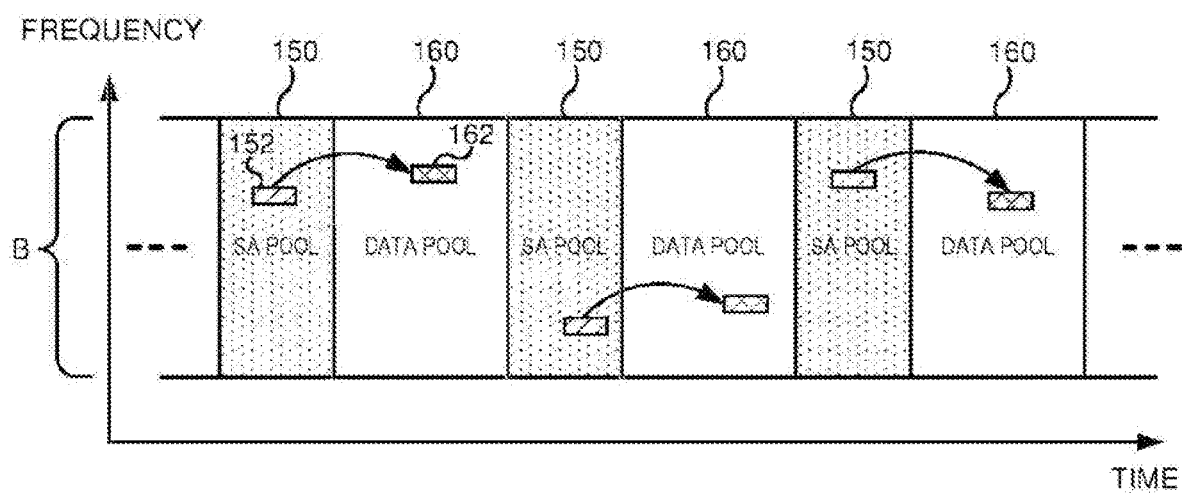
FIG. 2 illustrates a plurality of alternating scheduling assignment pools and data pools that occupy a bandwidth in a time-frequency space.

This approach is illustrated in FIG. 2, which is a diagram that illustrates a plurality of alternating SA pools 150 and data pools 160 that occupy a bandwidth B in a time-frequency space. Scheduling assignment transmissions 152 are transmitted using resources from the scheduling pools 150 and refer to resources in the immediately following data pools 160 that will be used to transmit data packets 162. Because the SA pools 150 are dimensioned to accommodate both short latency requirements and high capacity requirements, the SA pools 150 may be relatively large, which increases the amount of overhead consumed by the SA pools.

First Embodiment (SA Messages Indicate Periodic Allocations)

In a first embodiment, periodic resources are scheduled using a single SA message. Accordingly, it is not necessary to transmit SA transmissions in successive SA pools, which frees up resources in subsequent SA pools. Moreover, different SAs may schedule different numbers of transmissions.

Figure 3:
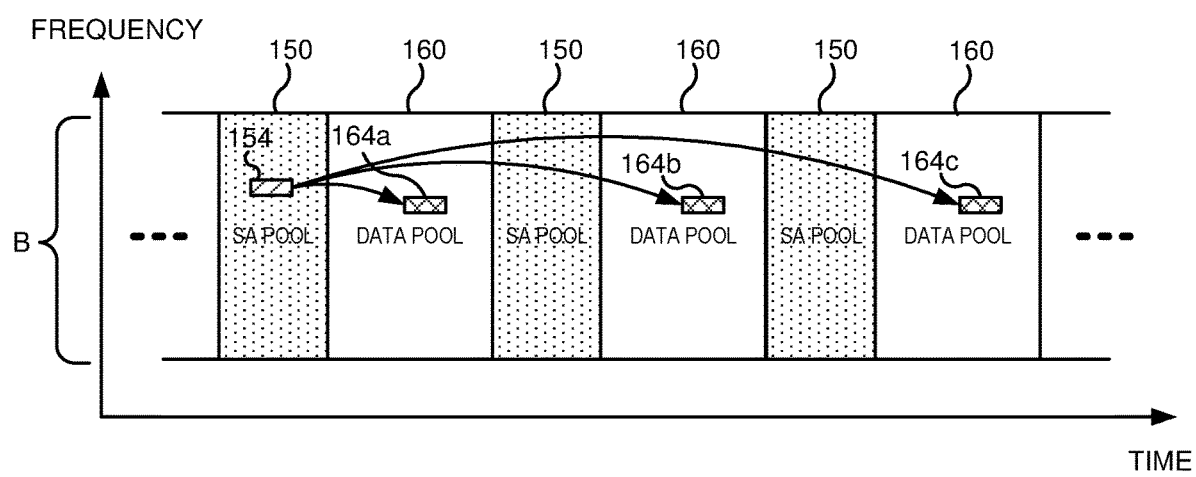
FIG. 3 illustrates a single message scheduling assignment transmission that schedules periodic data resources.

A single message SA transmission that schedules periodic data resources is illustrated in FIG. 3. As shown therein, a single SA transmission 154 transmitted using resources from an SA pool 150 may identify resources for data transmissions 164a, 164b, 164c in multiple successive data pools 160. The SA transmission may not need to be repeated in each of the SA pools 150 prior to the data pools 160 in which the successive data transmissions 164b, 164c are transmitted. The SA transmission 154 may be repeated in non-successive SA pools 150, such as every fourth SA pool, every fifth SA pool, etc., depending on the length of the reservation.

The number of data transmissions (or equivalently the duration of the assignment) can be explicitly signaled in the SA transmission 154 or it can be derived from one or more characteristics or properties of the SA transmission 154 (e.g., reference signal sequence, scrambling codes, resources used, etc.). For example, SA transmissions transmitted using particular resources may schedule a certain number of retransmissions, while SAs transmitted on other resources on the same carrier may schedule a different number of retransmissions. For example, SA transmissions transmitted in the first symbol, time slot, or frequency of an SA pool may schedule K retransmissions by default, while SA transmissions transmitted in the second symbol, time slot, or frequency of the SA pool may schedule L retransmissions by default, where K and L are integers and K< >L.

In some embodiments, the SA transmissions can indicate a retransmission periodicity of the data message according to any of the methods described herein. In one example, some SA transmissions 154 may schedule periodic transmissions while other SA transmissions 154 may schedule aperiodic transmissions. The periodicity and/or number of retransmissions may be indicated by the content of the SA transmission 154 or any other property of the SA transmission 154, including the resources used for the SA transmission 154, such as time slot, symbol, frequency, scrambling code, reference signal sequence, etc.

Figures 4A, 4B:
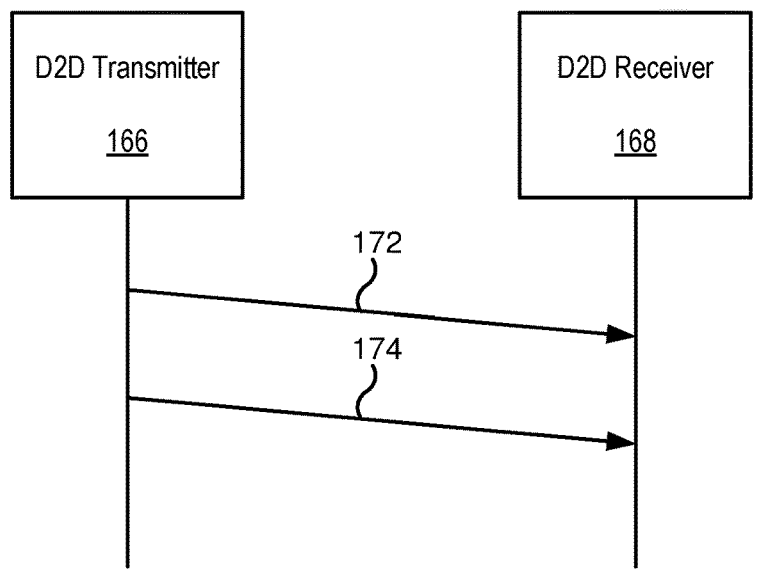
FIG. 4A is a flowchart and FIG. 4B is a block diagram that illustrate methods of reserving resources in periodically occurring resource pools according to some embodiments.

FIG. 4A is a flowchart and FIG. 4B is a block diagram that illustrate methods of reserving resources in periodically occurring resource pools according to the First Embodiment. The methods may be performed by a radio communication device that acts as a D2D transmitter 166. The methods include transmitting a scheduling assignment message from the D2D transmitter 166 on a shared medium during a predefined period that is defined for the transmission of scheduling assignment messages (block 172). The scheduling message is transmitted to a D2D receiver 168. The scheduling assignment message indicates resources in a plurality of the periodically occurring resource pools for transmission of a data message. The methods further include transmitting the data message in the identified resources in the plurality of the periodically occurring resource pools (block 174).

In some embodiments, the scheduling assignment message may identify the same resources in each of the plurality of the periodically occurring resource pools. For example, the scheduling assignment message may identify the same frequency, time slot, scrambling code, symbol, etc., in each of the plurality of the periodically occurring resource pools.

The scheduling message may schedule a number of transmissions in the periodically occurring resource pools based on a characteristic of the scheduling assignment message, such as a resource used for the transmission of the scheduling assignment message.

The scheduling assignment message may specify a number of retransmissions of the data message.

Figure 4C:
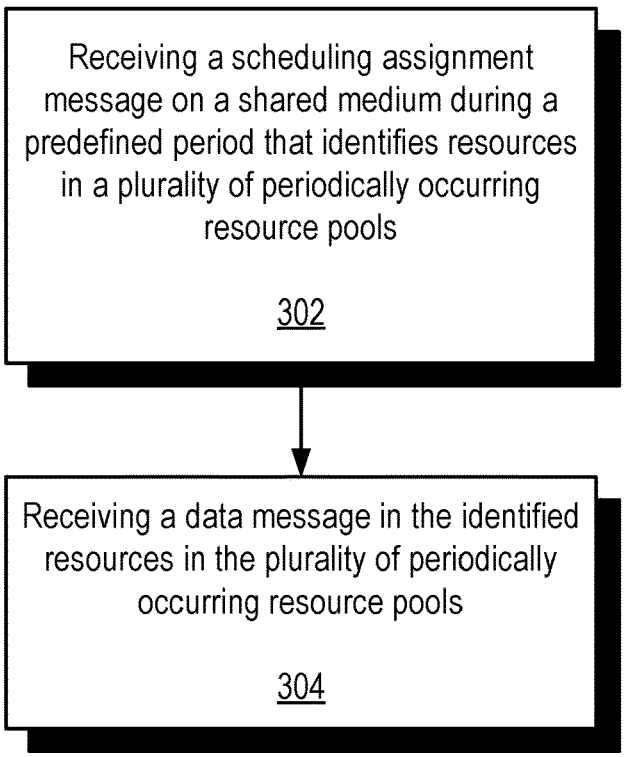
FIG. 4C is a flowchart and FIG. 4D is a block diagram that illustrate methods of receiving data messages transmitted in periodically occurring resource pools according to some embodiments.
Figure 4D:
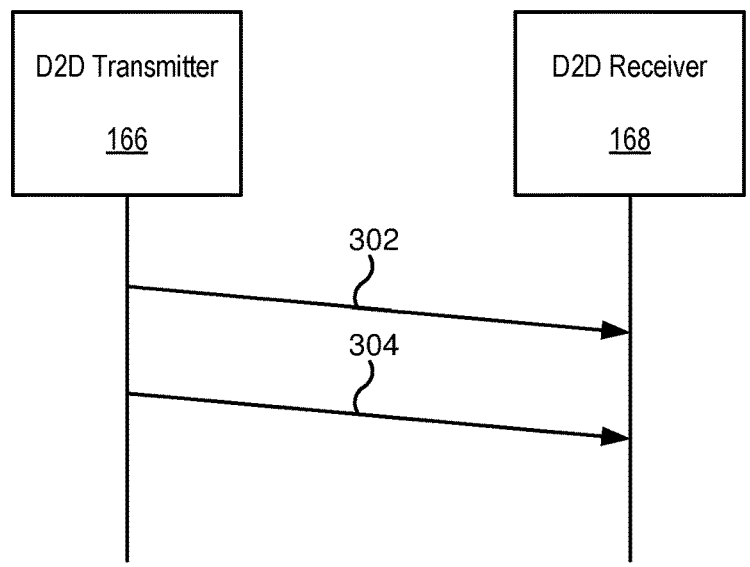

FIG. 4C is a flowchart and FIG. 4D is a block diagram that illustrate methods of receiving data messages transmitted in periodically occurring resource pools according to the First Embodiment. The methods may be performed by a radio communication device that acts as a D2D receiver 168. The methods include receiving a scheduling assignment message from a D2D transmitter 166 on a shared medium during a predefined period that is defined for the transmission of scheduling assignment messages (block 302). The scheduling assignment message indicates resources in a plurality of the periodically occurring resource pools for transmission of a data message. The methods further include receiving the data message in the identified resources in the plurality of the periodically occurring resource pools (block 304).

Second Embodiment (Multiple SA Pools Associated with Different Requirements)

A second embodiment is based on the consideration that if N users contend for M contention-based resources for transmission and each user performs multiple transmissions of each message (as typically done for SA transmissions) it may be more efficient (in terms of interference, inband emissions and/or blocking) to let all users contend for a large pool of M resources rather than fractioning the pools and the users into respectively M/K and N/K subsets where each user can only access one of the subsets. This leads to the consideration that it may be convenient to group all SA transmissions associated with periodic transmissions into a large common pool. Since such a large pool may, however, occur relatively infrequently in time, delay sensitive transmissions can use multiple smaller SA pools that are allocated more frequently in time.

Based on the foregoing considerations, in some embodiments, multiple sets of periodic control resources (e.g., multiple SA pools) are defined. The different SA pools may have different periodicities, different sizes and/or different radio properties in general. In addition, a rule may be defined that describes the set of control resources that are to be used for each type of transmission, where "type of transmission" refers to any properties or requirements of the transmission that can be relevant for selecting the correct set of control resources. For example, the control resource set may be selected based on the latency, throughput and/or reliability requirements associated with a given transmission.

Figure 5:
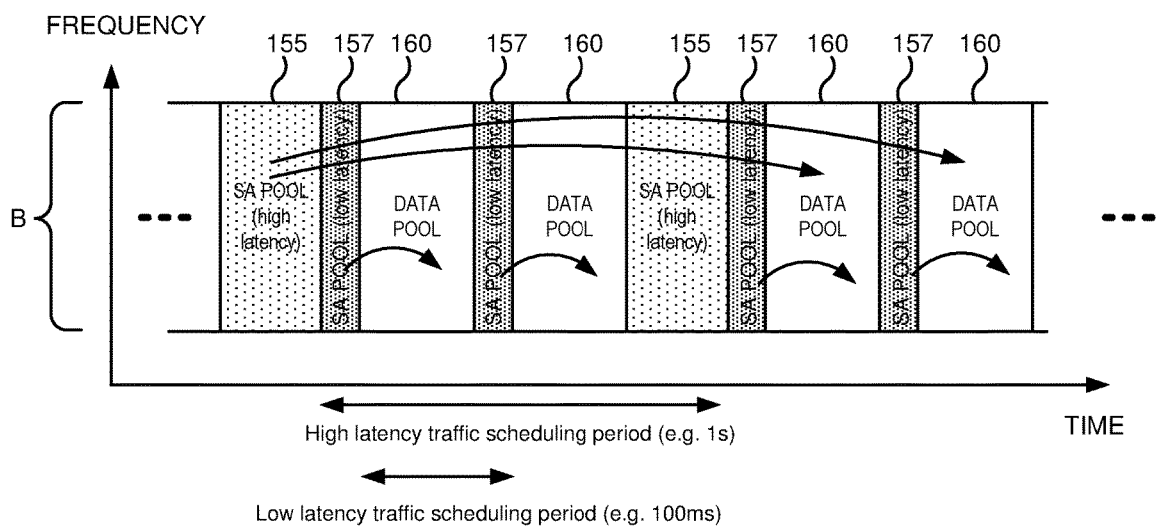
FIGS. 5 and 6 illustrate arrangements of scheduling assignment pools according to some embodiments.

Such an arrangement is illustrated in FIG. 5. As shown therein, two types of SA pools are defined, namely a first SA pool 155 that is used for high latency SA transmissions and a second SA pool 157 that is used for SA transmissions needing low latency. Each type of SA pool repeats periodically; however, the period of repetition of the first type of SA pool 155 is greater than the period of repetition of the second type of SA pool 157.

SA transmissions in the first type of SA pool 155 schedule transmissions in a data pool that is distant in time from the SA pool in which the SA transmission occurs. For example, the scheduling period for high latency traffic may be greater than 0.5 s, and in some cases as high as 1s or more. In contrast, the SA transmission in the second type of SA pool 157 may schedule transmissions with a relatively low latency, for example less than 0.5 s and in some cases 100 ms or lower.

Note that the SA transmissions in the second type of SA pool 157 may schedule resources in the next immediately following data pool 160, while the SA transmissions in the first type of SA pool 155 may schedule resources in a subsequent data pool, and in some cases a data pool after the next subsequent one of the first type of SA pool 155 occurs. However, the inventive concepts are not limited to such an arrangement.

Although two types of SA pools 155, 157 are illustrated in FIG. 5, the inventive concepts are not limited to such an arrangement. That is, more than two types of SA pools having different latency characteristics may be defined according to some embodiments.

Figure 6:
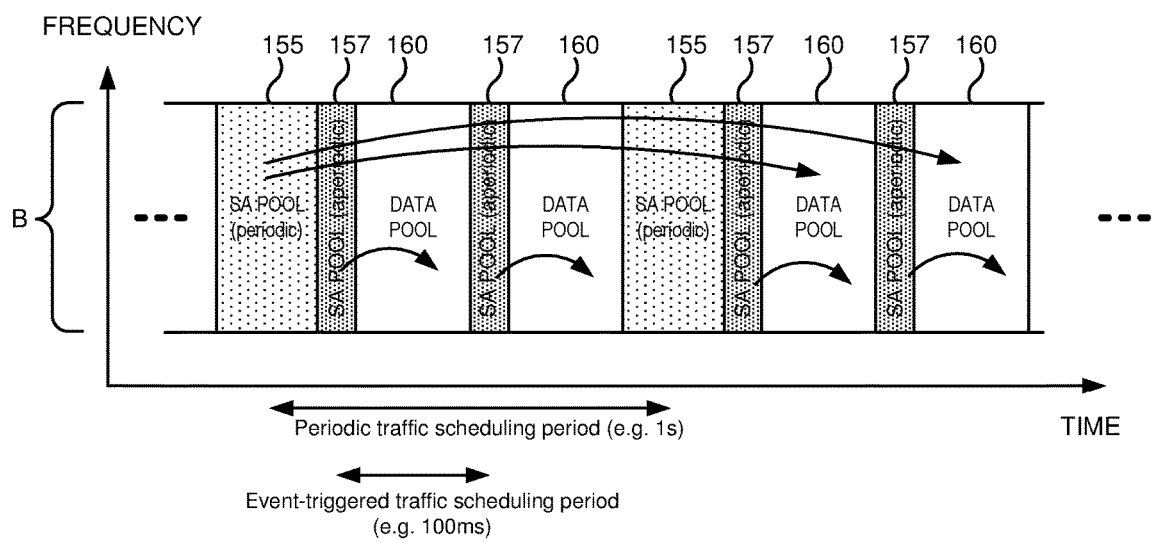

FIG. 6 illustrates an example in which resources are selected from an SA pool based on whether the data transmission is periodic or event-triggered (sometimes referred to as aperiodic). In FIG. 6, a first SA pool 155 is used for SA transmissions that assign periodic data pool resources, while a second SA pool 157 is used for SA transmissions that assign aperiodic or event-based data pool resources.

In the embodiments illustrated in FIG. 6, SA transmissions in the first type of SA pool 155 schedule periodic transmissions in data pools that are distant in time from the SA pool in which the SA transmission occurs. For example, the scheduling period for periodic data traffic may be greater than 0.5 s, and in some cases as high as 1s or more. In contrast, the SA transmission in the second type of SA pool 157 may schedule aperiodic or event-based data transmissions. Such transmissions may be scheduled with a low latency relative to the periodic data transmissions.

In the example of FIG. 6 there is a pool intended for carrying SAs scheduling periodic traffic with low frequency, and an SA pool intended for scheduling aperiodic traffic with higher frequency. A UE scheduling periodic traffic will use the first pool while a UE scheduling aperiodic traffic will use the first suitable SA pool for aperiodic traffic. Some exceptions to the mapping rules can also be considered as discussed below in connection with the Fourth Embodiment.

In each of the foregoing embodiments, control information is transmitted within a pool of control information radio resources while data is transmitted within a pool of data radio resources. One or more rules may be defined to map the control information to the associated data transmission.

Although the data pools and SA pools are illustrated in FIGS. 3, 5 and 6 as not overlapping in time, it will be appreciated that in some embodiments there may be partial or complete overlap of the different pools, at least in some of their repetitions.

The radio resources as well as the rules for accessing them may be defined by a standard and/or controlled by a NW infrastructure (eNodeB) by use of any type of signaling.

FIG. 7A is a flowchart that illustrates methods of reserving resources in periodically occurring resource pools according to the Second Embodiment. The methods may be performed by a radio communication device. As shown in FIG. 7A, the methods include transmitting (180) a scheduling assignment message on a shared medium in a scheduling assignment pool. The scheduling assignment message indicates resources in one of the periodically occurring resource pools for transmission of a data message, and the scheduling assignment pool is selected from one of a first scheduling assignment pool and a second scheduling assignment pool that is different from the first scheduling assignment pool depending on a characteristic of the data message FIG. 7B is a flowchart and FIG. 7C is a block diagram that illustrate further methods according to the Second Embodiment. The methods illustrated in FIGS. 7B and 7C include transmitting a first scheduling assignment message on a shared medium in a first scheduling assignment pool. The first scheduling assignment pool is defined and/or reserved for the transmission of scheduling assignment messages that schedule transmission of data messages having a first characteristic (block 182). The methods further include transmitting a second scheduling assignment message on the shared medium in a second scheduling assignment pool. The second scheduling assignment pool is reserved and/or defined for the transmission of scheduling assignment messages that schedule transmission of data messages having a second characteristic that is different from the first characteristic (block 184). The first scheduling assignment message indicates resources in one of the periodically occurring resource pools for transmission of a first data message, and the second scheduling assignment message indicates resources in a second of the periodically occurring resource pools for transmission of a second data message.

The characteristic may include a latency requirement and/or a throughput requirement.

The first scheduling assignment pool may repeat with a first periodicity and the second scheduling assignment pool may repeat with a second periodicity that is different from the first periodicity.

The first scheduling assignment pool may include a first number of transmission resources and the second scheduling assignment pool may include a second number of transmission resources that is different from the first number of transmission resources.

The first scheduling assignment pool may be defined for scheduling assignment messages that schedule data transmissions requiring low latency, and each of the first scheduling assignment pools may be followed immediately by one of the periodically occurring resource pools.

The periodically occurring resource pools and the first and second scheduling assignment pools may each occupy the same bandwidth and are separated in time.

The first scheduling assignment pool may be reserved for scheduling assignment messages that schedule data transmissions requiring a latency of 0.5 s or less and the second scheduling assignment pool may be defined for scheduling assignment messages that schedule data transmissions requiring a latency greater than 0.5 s.

The first scheduling assignment pool may be defined for the transmission of scheduling assignment messages that identify resources for event-driven data messages and the second scheduling assignment pool may be reserved for the transmission of scheduling assignment messages that identify resources for periodic data messages.

FIG. 7D is a flowchart that illustrates methods of receiving data messages transmitted in periodically occurring resource pools according to the Second Embodiment. The methods may be performed by a radio communication device. The methods include receiving a first scheduling assignment message on a shared medium in a first scheduling assignment pool that is defined for the transmission of scheduling assignment messages that schedule transmission of data messages having a first characteristic (block 312), and receiving a second scheduling assignment message in a second scheduling assignment pool that is defined for the transmission of scheduling assignment messages that schedule transmission of data messages having a second characteristic (block 314).

Third Embodiment (Combining Control Information Subpools Spanning Frequency and Time)

For some type of transmissions, it may be desirable for control information resources to be concentrated in time, but to span a large part or the whole bandwidth, such as illustrated in FIGS. 3, 5 and 6, in which the SA pools span the entire available bandwidth B. For example, a resource allocation subpool may refer to data transmission resources in data subpool that occurs later in time. In this way, small latencies can be achieved. For other type of transmissions, it may be desirable to spread the control information resources over a larger time interval but to be concentrated in frequency. Such a distribution of control information resources may eliminate/reduce the half-duplex problems that can otherwise arise, since only one/few users can be multiplexed in frequency. This may be reasonable for transmissions with high reliability requirements or for transmissions that tolerate higher latencies.

Figure 8A:
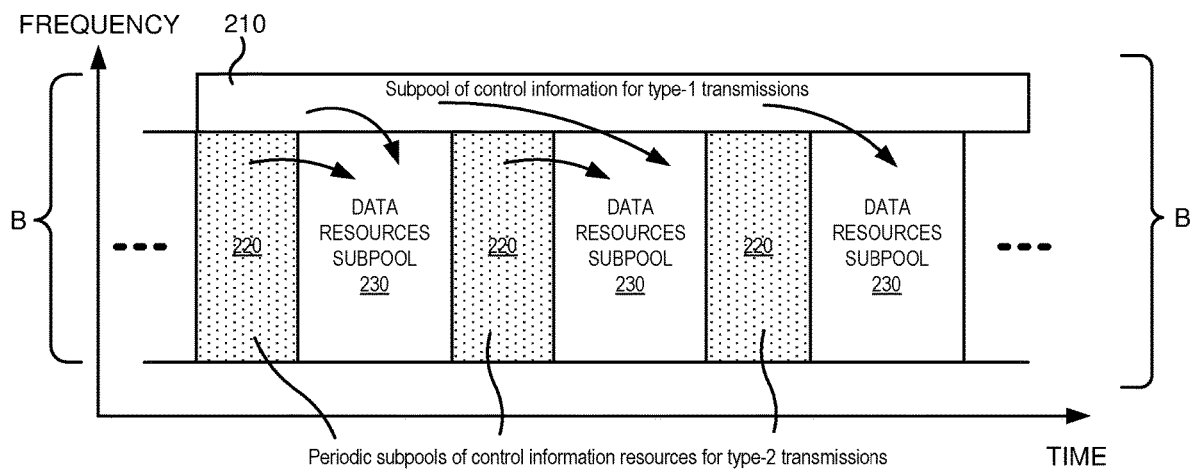
FIGS. 8A, 8B and 9 illustrate arrangements of scheduling assignment pools according to further embodiments.

An example is illustrated in FIG. 8A. SA transmissions may be categorized as type-1 transmissions or type-2 transmissions. Type-1 transmissions may refer, for example to SA transmissions that schedule periodic data transmissions or SA transmissions that do not need low latency, for example, while Type-2 transmissions may refer to SA transmissions that schedule aperiodic or event-based data transmissions or transmissions requiring low latency. Other categorizations are possible within the scope of the inventive concepts.

The control information for type-1 transmissions (e.g., for periodic transmissions) is transmitted on a specific subpool 210 of resources that spans a large time interval but is narrow in frequency, such that it occupies only a portion of the available bandwidth B. In this example, a single transmission of control information (e.g. a SA) in this subpool 210 schedules transmissions on multiple data subpools 230. The control information for type-2 transmissions (e.g. event-driven urgent transmissions) is transmitted on specific subpools 220 of resources that repeat periodically in time and which occupy only a few time resources but span most of the system bandwidth B. In this example, the transmission of control information in any of these periodic subpools 220 schedules the transmission of a single packet, possibly with retransmissions, in the next data subpool 230.

Figure 8B:
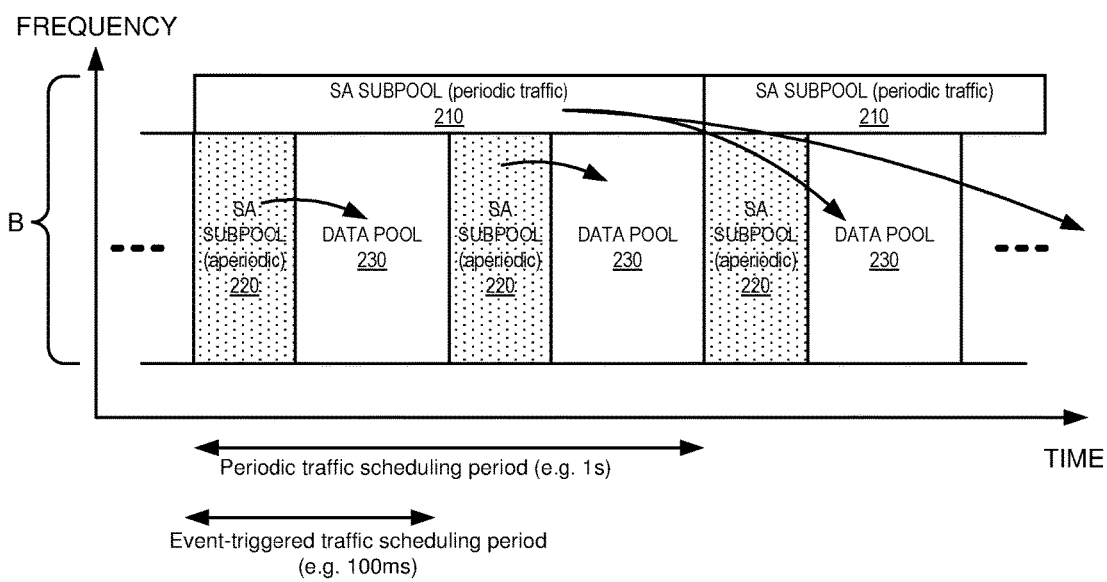

FIG. 8B illustrates an example of the Third Embodiment. As shown therein, first periodically repeating scheduling assignment subpools 210 are defined to carry periodic scheduling assignment messages, while second periodically repeating scheduling assignment subpools 220 are defined to carry event-driven scheduling assignment messages. The first scheduling assignment subpools 210 are carried in a separate frequency range than the second scheduling assignment subpools 220 and the data pools 230. The first scheduling assignment subpools 210 overlap in time with the second scheduling assignment subpools 220 and the data pools 230. In particular, a single scheduling assignment subpool 210 may overlap in time with a plurality of the second scheduling assignment subpools 220 and data pools 230.

Scheduling assignment messages transmitted in the first scheduling assignment subpools 210 may have a first latency, while scheduling assignment messages transmitted in the second scheduling assignment subpools 220 may have a second latency that is shorter than the first latency.

Figure 9:
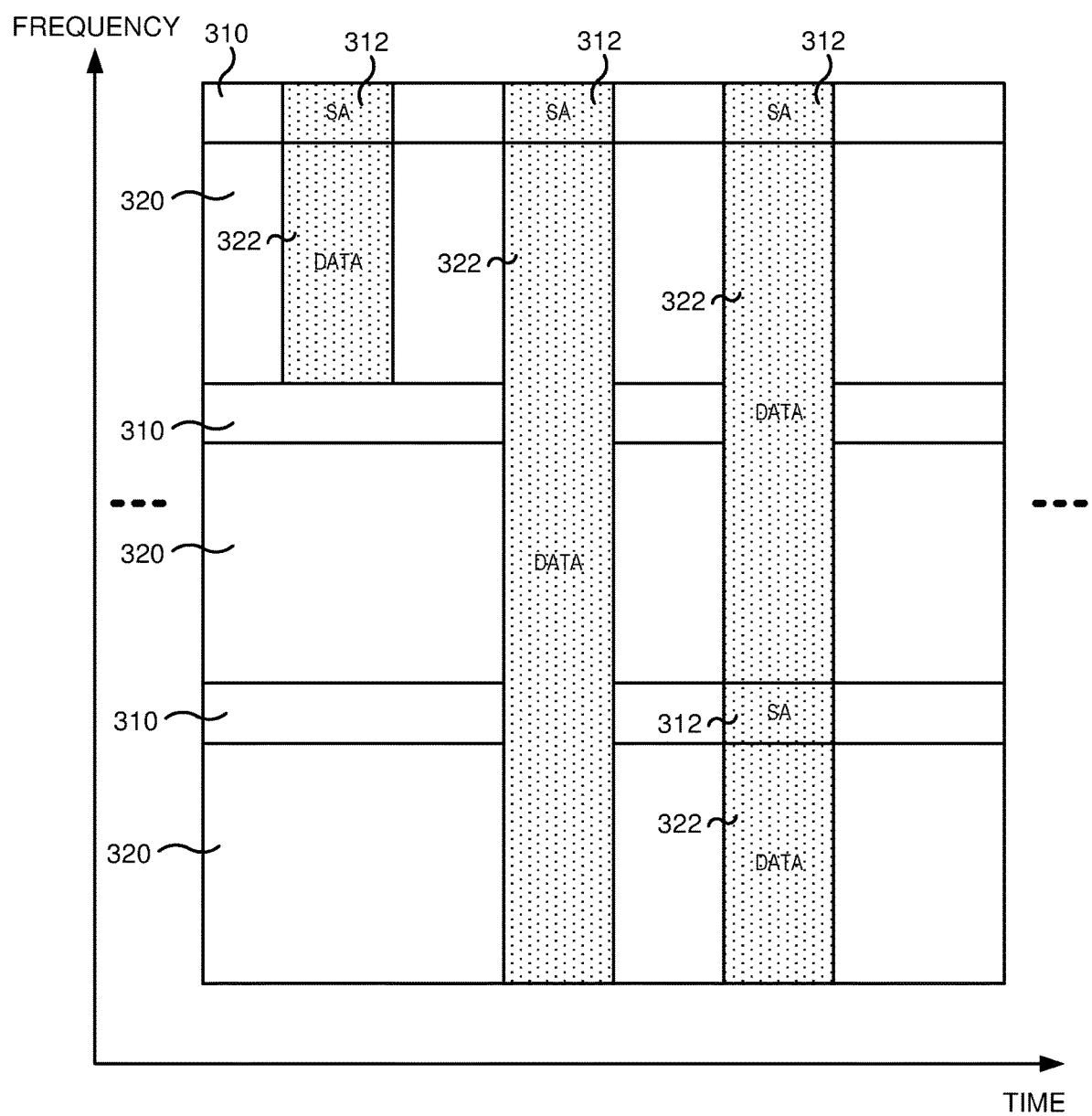

FIG. 9 illustrates an arrangement of scheduling assignment pools and data pools according to still further embodiments. As shown in FIG. 9, scheduling assignments 312 are transmitted in a plurality of scheduling assignment subpools 310 that collectively form a scheduling assignment pool. The scheduling assignment subpools 310 may be separated in frequency as shown in FIG. 9, or may be collected together in a single frequency band. The scheduling assignments 312 may schedule periodic or aperiodic resources in the overall bandwidth. Data transmissions 322 may be scheduled within data subpools 320. The data subpools 320 may be separated in frequency as shown in FIG. 9, or they may be arranged in a single frequency band. As illustrated in FIG. 9, the data transmissions 322 may overlap with the scheduling assignment subpools 310. That is, some of the data transmissions 322 may occur on resources belonging to the scheduling assignment subpools 310.

Fourth Embodiment (Pool Selection Rules)

Further embodiments of the inventive concepts provide methods of selecting an SA pool for transmission depending on the type of transmission and other parameters. In one example, at least two SA pools are available where one pool allows scheduling of multiple (or periodic) transmissions from a single SA while the second SA pool is selected if the traffic is aperiodic.

Such a mapping rule may be modified in order to optimize a parameter, such as overhead, capacity and/or latency of the D2D system.

Referring to FIGS. 1 and 8B, consider a situation in which some, but not all, of the SA pools 210, 220 are congested due to high traffic load. In this case, a UE may create an exception to the SA mapping rule and use, for example, the SA pool 220 for aperiodic traffic to schedule periodic traffic. The mapping rule from traffic type to SA pool may be controlled by the LTE network 100 via signaling. The mapping can be based on UE implementation or it can be defined in a specification. Different rules may also be applied depending whether different pools are configured for a given carrier and/or if a UE has access right to such pools. Congestion of one or more pools can be detected by the UE and/or NW infrastructure via measurements or any other detection/sensing technique.

In the case where a UE 120 receives periodic traffic in its transmit buffer, and aperiodic traffic scheduling resources occur in future time instances before the next suitable periodic traffic scheduling resource, the UE may use aperiodic traffic scheduling resources as a temporary solution until it is able to use the resources for periodic traffic scheduling. This method may reduce scheduling latency for periodic traffic.

In a further example a UE 120 may not be aware of the periodicity of its own traffic. In this case, the UE 120 may, for example, use aperiodic (or alternatively periodic) traffic SA resources until it becomes aware of its traffic periodicity.

Figure 10:
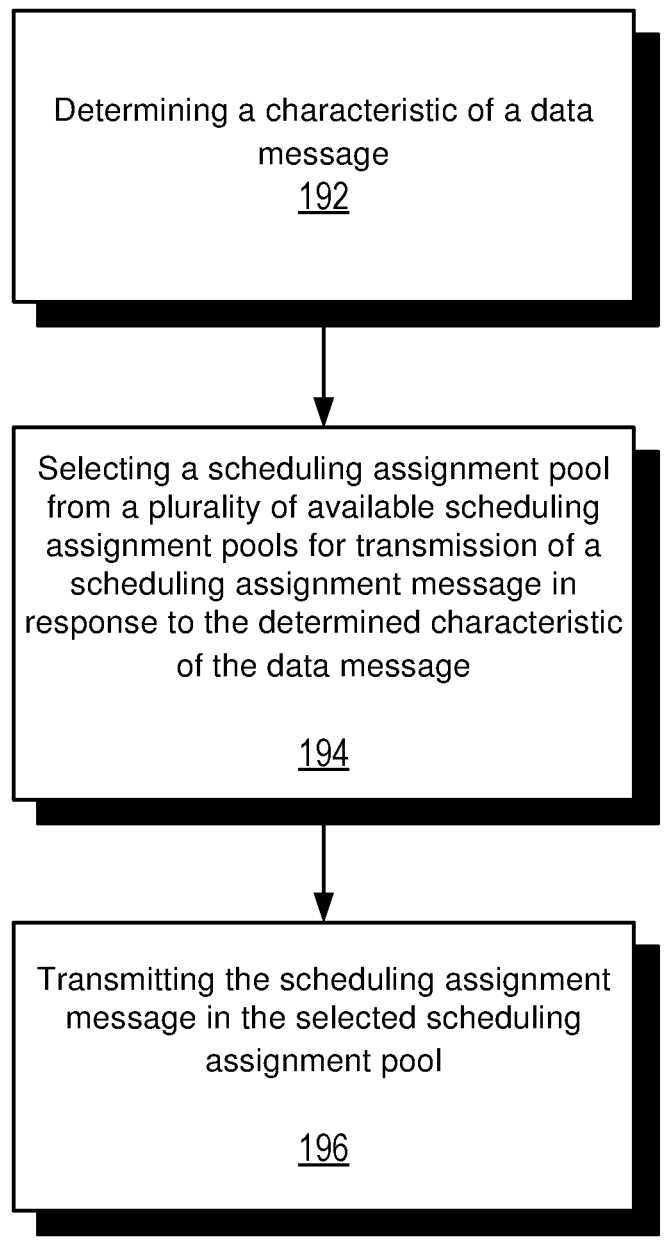
FIG. 10 is a flowchart that illustrates methods of selecting a scheduling assignment pool from a plurality of available scheduling assignment pools according to some embodiments.

FIG. 10 is a flowchart that illustrates methods of selecting a scheduling assignment pool from a plurality of available scheduling assignment pools for transmission of a scheduling assignment message that schedules transmission of a data message according to some embodiments. The methods may be performed by a radio communication device. The methods include determining a characteristic of the data message (block 192), selecting a scheduling assignment pool from the plurality of available scheduling assignment pools for transmission of the scheduling assignment message in response to the determined characteristic of the data message (block 194), and transmitting the scheduling assignment message in the selected scheduling assignment pool (block 196).

The available scheduling assignment pools may include first scheduling assignment pools and second scheduling assignment pools, wherein the first scheduling assignment pools are defined for event-driven scheduling assignment messages and the second scheduling assignment pools are defined for periodic scheduling assignment messages. Determining the characteristic of the data message may include determining whether the data message is a periodic data message or an event-driven data message.

The available scheduling assignment pools may include first scheduling assignment pools and second scheduling assignment pools, wherein the first scheduling assignment pools have a first latency and the second scheduling assignment pools have a second latency that is larger than the first latency. Determining the characteristic of the data message may include determining a latency requirement of the data message.

Example UE and RAN

Non-limiting example user equipment nodes (UEs) can include, but are not limited to, tablet computers, mobile terminals, smart phones, desktop computers, laptop embedded equipped (LEE), laptop mounted equipment (LME), vehicle borne terminals, etc.

Figure 11:
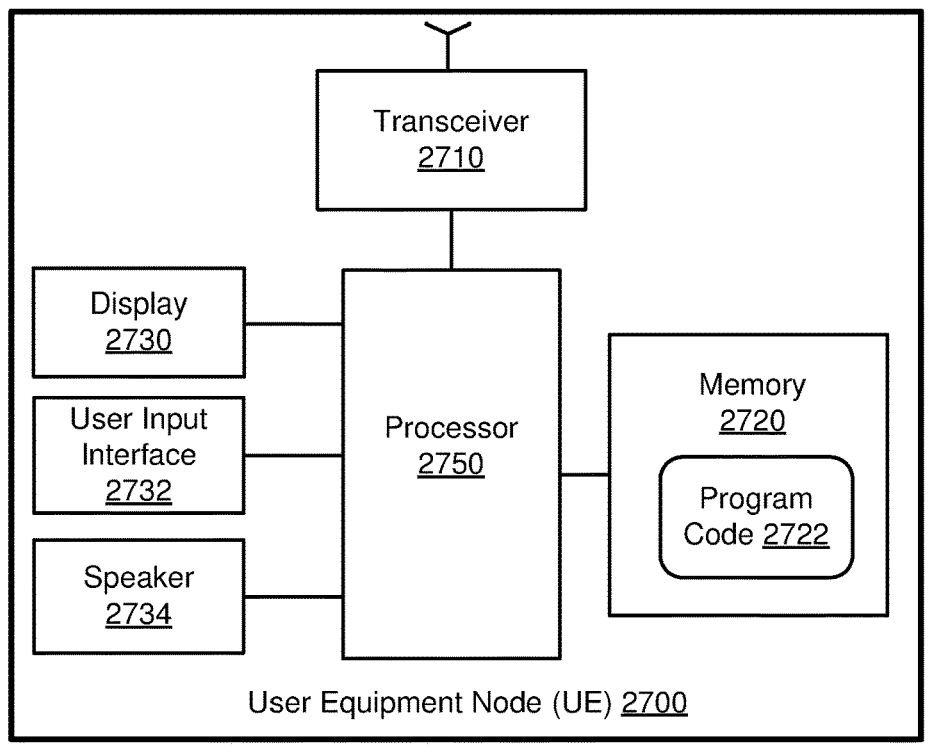
FIG. 11 is a block diagram of a user equipment (UE) that is configured to perform operations according to one or more embodiments.

FIG. 11 is a block diagram of a UE 2700 that is configured to perform operations according to one or more embodiments disclosed herein. The UE 2700 includes at least one transceiver 2710, at least one processor 2750, and at least one memory 2720 containing program code 2722. The UE 2700 may further include a display 2730, a user input interface 2732, and a speaker 2734.

The transceiver 2710 is configured to communicate with a RAN node and/or other UEs in a D2D mode through a wireless air interface using one or more of the radio access technologies disclosed herein. The processor 2750 may include one or more data processing circuits, such as a general purpose and/or special purpose processor, e.g., microprocessor and/or digital signal processor. The processor 2750 is configured to execute computer program instructions of the program code 2722 stored in the memory 2720 to perform at least some of the operations described herein as being performed by a UE.

Figure 12:
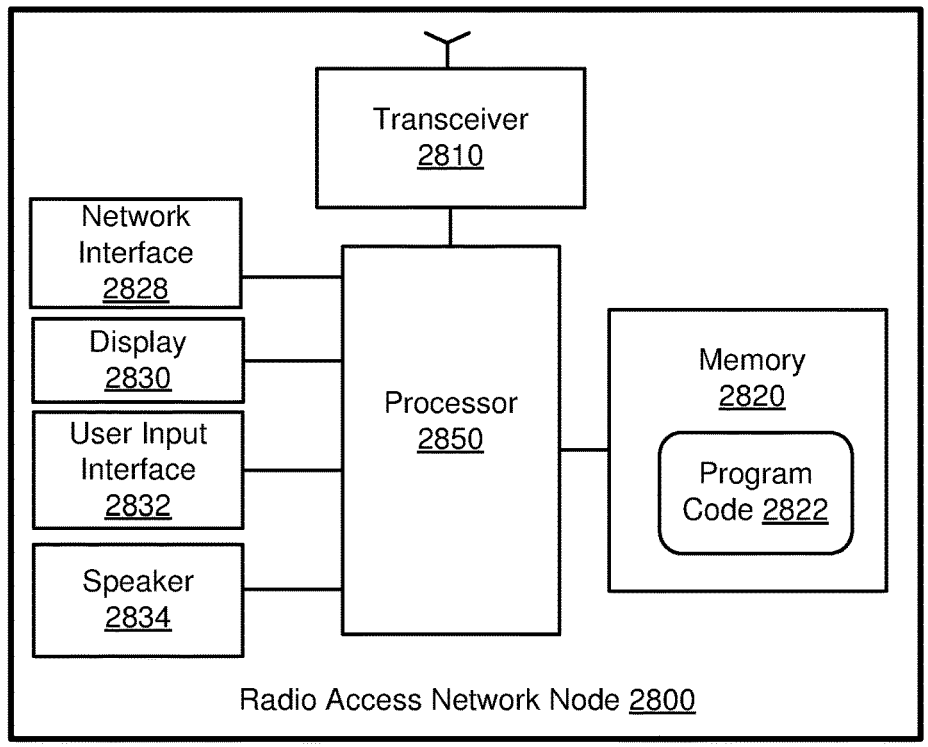
FIG. 12 is a block diagram of a radio access node (RAN) that is configured according to one or more embodiments.

FIG. 12 is a block diagram of a RAN node 2800 that is configured according to one or more embodiments disclosed herein. The RAN node 2800 can include at least one transceiver 2810, at least one network interface 2828, at least one processor 2850, and at least one memory 2820 containing program code 2822.

The transceiver 2810 is configured to communicate with UEs and other nodes using one or more of the radio access technologies disclosed herein, including in a D2D mode. The processor 2850 may include one or more data processing circuits, such as a general purpose and/or special purpose processor, e.g., microprocessor and/or digital signal processor, that may be collocated or distributed across one or more networks. The processor 2850 is configured to execute computer program instructions of the program code 2822 stored in the memory 2820 to perform at least some of the operations described herein as being performed by a RAN node. The network interface 2828 communicates with other RAN nodes and/or a core network.

Figure 13:
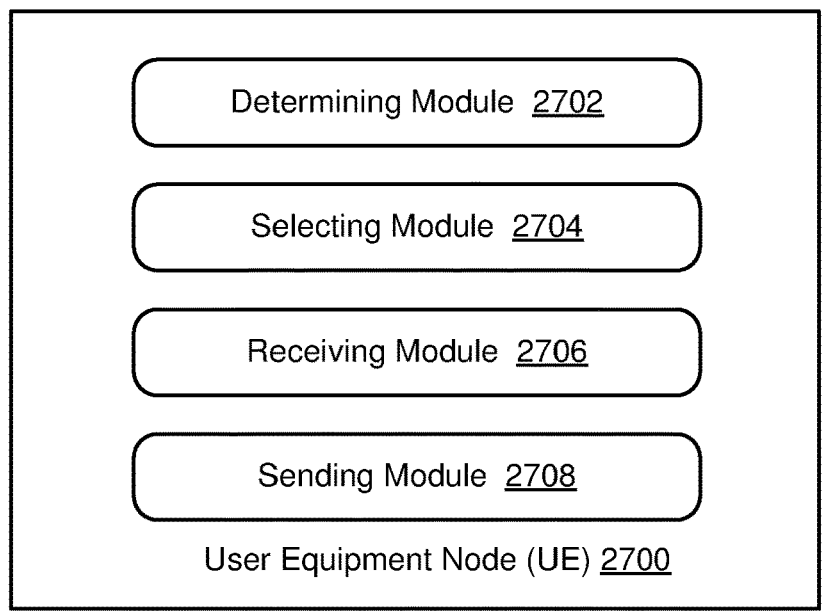
FIG. 13 illustrates modules residing in a UE that perform operations according to some embodiments.

FIG. 13 illustrates modules residing in the UE 2700 that perform operations as disclosed herein according to some embodiments. The UE 2700 includes a determining module 2702, a selecting module 2704, a receiving module 2706 and a sending module 2708. The determining module 2702 can determine a characteristic of a scheduling assignment message. The selecting module 2704 can select a scheduling assignment pool for transmitting the scheduling assignment message based on the determined characteristic of the scheduling assignment message. The receiving module 2706 receives scheduling assignment messages transmitted in scheduling assignment pools and data messages transmitted in data pools. The sending module 2708 transmits scheduling assignment messages and data messages. The modules 2702, 2704, 2706 and 2708 may perform other operations disclosed herein.

Figure 14:
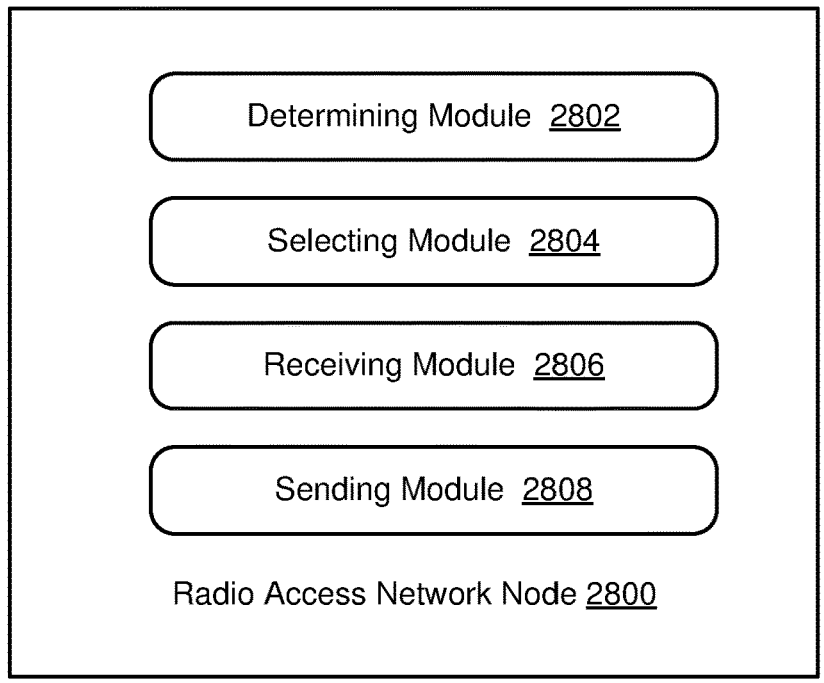
FIG. 14 illustrates modules residing in a RAN node that perform operations according to some embodiments.

FIG. 14 illustrates modules residing in the RAN node 2800 that perform operations as disclosed herein according to some embodiments. The RAN node 2800 includes a determining module 2802, a selecting module 2804, a receiving module 2806 and a sending module 2808. The determining module 2802 can determine a characteristic of a scheduling assignment message. The selecting module 2804 can select a scheduling assignment pool for transmitting the scheduling assignment message based on the determined characteristic of the scheduling assignment message. The receiving module 2806 receives scheduling assignment messages transmitted in scheduling assignment pools and data messages transmitted in data pools. The sending module 2808 transmits scheduling assignment messages and data messages. The modules 2802, 2804, 2806 and 2808 may perform other operations disclosed herein.

FURTHER EXAMPLE EMBODIMENTS

Embodiment 1

A method of indicating resources in periodically occurring resource pools, comprising: performing the following in a radio communication device: transmitting (172) a scheduling assignment message on a shared medium during a predefined period that is defined for the transmission of scheduling assignment messages, wherein the scheduling assignment message indicates resources in a plurality of the periodically occurring resource pools for transmission of a data message; and transmitting (174) the data message in the identified resources in the plurality of the periodically occurring resource pools.

Embodiment 2

The method of Embodiment 1, wherein the scheduling assignment message indicates the same resources in each of the plurality of the periodically occurring resource pools.

Embodiment 3

The method of any previous Embodiment, wherein the scheduling message indicates a number of transmissions in the periodically occurring resource pools based on a characteristic of the scheduling assignment message.

Embodiment 4

The method of Embodiment 3, wherein the characteristic of the scheduling assignment message comprises a resource used for the transmission of the scheduling assignment message.

Embodiment 5

The method of any previous Embodiment, wherein the scheduling assignment message specifies a number of retransmissions of the data message.

Embodiment 6

The method of any previous Embodiment, wherein the periodically occurring resource pools are selected among multiple resource pools, and wherein the selection is based on characteristics of the data message.

Embodiment 7

A radio communication device (2700, 2800) comprising: a transceiver (2710, 2810) including a transmitter and a receiver configured to transmit and receive wireless communications; and a processor (2750, 2850) coupled to the transceiver, wherein the processor is configured to perform operations according to any of Embodiments 1-5, wherein the processor is configured to receive wireless communications through the receiver of the transceiver and to transmit wireless communications through the transmitter of the transceiver.

Embodiment 8

A radio communication device (2700, 2800), comprising: a transceiver (2710, 2810) including a transmitter and a receiver configured to transmit and receive wireless communications; and a processor (2750, 2850) coupled to the transceiver, wherein the processor is configured to receive wireless communications through the receiver of the transceiver and to transmit wireless communications through the transmitter of the transceiver; wherein the processor is configured to: transmit (172) a scheduling assignment message on a shared medium during a predefined period that is defined for the transmission of scheduling assignment messages, wherein the scheduling assignment message indicates resources in a plurality of periodically occurring resource pools for transmission of a data message; and transmit (174) the data message in the identified resources in the plurality of the periodically occurring resource pools.

Embodiment 9

A radio communication device (110, 120, 2700, 2800) operating in a telecommunications system, wherein the radio communication device is adapted to: transmit (172) a scheduling assignment message on a shared medium during a predefined period that is defined for the transmission of scheduling assignment messages, wherein the scheduling assignment message indicates resources in a plurality of periodically occurring resource pools for transmission of a data message; and transmit (174) the data message in the identified resources in the plurality of the periodically occurring resource pools.

Embodiment 10

A method of indicating resources in periodically occurring resource pools, comprising: performing the following in a radio communication device: transmitting (182) a first scheduling assignment message on a shared medium in a first scheduling assignment pool that is defined for the transmission of scheduling assignment messages that schedule transmission of data messages having a first characteristic, wherein the first scheduling assignment message indicates resources in one of the periodically occurring resource pools for transmission of a first data message; and transmitting (184) a second scheduling assignment message on the shared medium in a second scheduling assignment pool that is defined for the transmission of scheduling assignment messages that schedule transmission of data messages having a second characteristic that is different from the first characteristic, wherein the second scheduling assignment message indicates resources in a second of the periodically occurring resource pools for transmission of a second data message.

Embodiment 11

The method of Embodiment 10, wherein the characteristic comprises a latency requirement and/or a throughput requirement.

Embodiment 12

The method of Embodiment 10 or 11, wherein the first scheduling assignment pool repeats with a first periodicity and the second scheduling assignment pool repeats with a second periodicity that is different from the first periodicity.

Embodiment 13

The method of any of Embodiments 10-12, wherein the first scheduling assignment pool comprises a first number of transmission resources and the second scheduling assignment pool comprises a second number of transmission resources that is different from the first number of transmission resources.

Embodiment 14

The method of any of Embodiments 10-13, wherein the characteristic comprises a latency requirement and the first scheduling assignment pool is defined for scheduling transmission of data messages requiring low latency, and wherein each of the first scheduling assignment pools is followed immediately by one of the periodically occurring resource pools.

Embodiment 15

The method of any of Embodiments 10-14, wherein the periodically occurring resource pools and the first and second scheduling assignment pools each occupies the same bandwidth and are separated in time.

Embodiment 16

The method of any of Embodiments 10-15, wherein the characteristic comprises a latency requirement and the first scheduling assignment pool is defined for scheduling transmission of data messages requiring a latency of 0.5 s or less and the second scheduling assignment pool is defined for scheduling transmission of data messages requiring a latency greater than 0.5 s.

Embodiment 17

The method of any of Embodiments 10-16, wherein the first scheduling assignment pool is defined for the transmission of scheduling assignment messages that identify resources for event-driven data messages and the second scheduling assignment pool is defined for the transmission of scheduling assignment messages that identify resources for periodic data messages.

Embodiment 18

The method of any of Embodiments 10-17, wherein the periodically occurring resource pools and the first scheduling assignment pools each occupy a first bandwidth and are separated in time, and wherein the second scheduling assignment pools overlap in time with both the periodically occurring resource pools and the first scheduling assignment pools and occupy a second bandwidth that is different from the first bandwidth.

Embodiment 19

The method of Embodiment 18, wherein the second bandwidth is smaller than the first bandwidth.

Embodiment 20

The method of Embodiment 19, wherein the second scheduling assignment pools overlap in time with a plurality of the periodically occurring resource pools and the first scheduling assignment pools.

Embodiment 21

The method of Embodiment 18, wherein the first scheduling assignment pool is defined for the transmission of scheduling assignment messages that identify resources for event-driven data messages and the second scheduling assignment pool is defined for the transmission of scheduling assignment messages that identify resources for periodic data messages.

Embodiment 22

A radio communication device (2700, 2800) comprising: a transceiver (2710, 2810) including a transmitter and a receiver configured to transmit and receive wireless communications; and a processor (2750, 2850) coupled to the transceiver, wherein the processor is configured to perform operations according to any of Embodiments 9-20, wherein the processor is configured to receive wireless communications through the receiver of the transceiver and to transmit wireless communications through the transmitter of the transceiver.

Embodiment 23

A radio communication device (2700, 2800), comprising: a transceiver (2710, 2810) including a transmitter and a receiver configured to transmit and receive wireless communications; and a processor (2750, 2850) coupled to the transceiver, wherein the processor is configured to receive wireless communications through the receiver of the transceiver and to transmit wireless communications through the transmitter of the transceiver; wherein the processor is configured to transmit (182) a first scheduling assignment message on a shared medium in a first scheduling assignment pool that is defined for the transmission of scheduling assignment messages that schedule transmission of data messages having a first characteristic, wherein the first scheduling assignment message indicates resources in a first one of a plurality of periodically occurring resource pools for transmission of a first data message; and wherein the processor is configured to (184) transmit a second scheduling assignment message on the shared medium in a second scheduling assignment pool that is defined for the transmission of scheduling assignment messages that schedule transmission of data messages having a second characteristic that is different from the first characteristic, wherein the second scheduling assignment message indicates resources in a second of the plurality of periodically occurring resource pools for transmission of a second data message.

Embodiment 24

A radio communication device (110, 120, 2700, 2800) operating in a telecommunications system, wherein the radio communication device is adapted to: transmit (182) a first scheduling assignment message on a shared medium in a first scheduling assignment pool that is defined for the transmission of scheduling assignment messages that schedule transmission of data messages having a first characteristic, wherein the first scheduling assignment message indicates resources in a first one of a plurality of periodically occurring resource pools for transmission of a first data message; and transmit (184) a second scheduling assignment message on the shared medium in a second scheduling assignment pool that is defined for the transmission of scheduling assignment messages that schedule transmission of data messages having a second characteristic that is different from the first characteristic, wherein the second scheduling assignment message indicates resources in a second of the plurality of periodically occurring resource pools for transmission of a second data message.

Embodiment 25

A method of selecting a scheduling assignment pool from a plurality of available scheduling assignment pools for transmission of a scheduling assignment message, comprising: performing the following on a radio communication device: determining (192) a characteristic of a data message; selecting (194) a scheduling assignment pool from the plurality of available scheduling assignment pools for transmission of a scheduling assignment message in response to the determined characteristic of the data message; and transmitting (196) a scheduling assignment message in the selected scheduling assignment pool, wherein the scheduling assignment message indicates resources in at least one of a plurality of data pools for transmission of the data message.

Embodiment 26

The method of Embodiment 25, wherein the scheduling assignment pool is selected according to a rule.

Embodiment 27

The method of Embodiment 25 or 26, wherein the available scheduling assignment pools comprise first scheduling assignment pools and second scheduling assignment pools, wherein the first scheduling assignment pools are defined for scheduling event-driven data messages and the second scheduling assignment pools are defined for scheduling periodic data messages, and wherein determining the characteristic of the data message comprises determining whether the data message is a periodic data message or an event-driven data message.

Embodiment 28

The method of any of Embodiments 25-27, wherein the available scheduling assignment pools comprise first scheduling assignment pools and second scheduling assignment pools, wherein the first scheduling assignment pools have a first latency and the second scheduling assignment pools have a second latency that is larger than the first latency, and wherein determining the characteristic of the data message comprises determining a latency requirement of the data message.

Embodiment 29

The method of any of Embodiments 25-28, wherein the scheduling assignment message indicates resources in plurality of periodically repeating data pools for transmission of a data message.

Embodiment 30

The method of any of Embodiments 25-29, wherein different ones of the plurality of available scheduling assignment pools are associated with different requirements for transmission of data messages scheduled in the scheduling assignment pools.

Embodiment 31

The method of any of Embodiments 25-30, wherein the scheduling assignment pools comprise first and second scheduling assignment pools and that have a first bandwidth that overlaps with a bandwidth of the plurality of data pools and that are separated in time from the data pools, wherein the first and second scheduling assignment pools have different periodicities.

Embodiment 32

The method of any of Embodiments 25-30, wherein the scheduling assignment pools comprise first and second scheduling assignment pools, wherein the first scheduling assignment pools have a first bandwidth that overlaps with a bandwidth of the plurality of data pools and are separated in time from the data pools, and wherein the second scheduling assignment pools have a second bandwidth that is different from the first bandwidth.

Embodiment 33

The method of Embodiment 32, wherein the first bandwidth and the second bandwidth do not overlap.

Embodiment 34

The method of Embodiment 32 or 33, wherein the first scheduling assignment pools and the second scheduling assignment pools have different periodicities.

Embodiment 35

A radio communication device (2700, 2800) comprising: a transceiver (2710, 2810) including a transmitter and a receiver configured to transmit and receive wireless communications; and a processor coupled to the transceiver, wherein the processor is configured to perform operations according to any of Embodiments 24-27, wherein the processor is configured to receive wireless communications through the receiver of the transceiver and to transmit wireless communications through the transmitter of the transceiver.

Embodiment 36

A radio communication device (2700, 2800), comprising: a transceiver (2710, 2810) including a transmitter and a receiver configured to transmit and receive wireless communications; and a processor (2750, 2850) coupled to the transceiver, wherein the processor is configured to receive wireless communications through the receiver of the transceiver and to transmit wireless communications through the transmitter of the transceiver; wherein the processor is configured to determine (192) a characteristic of a data message, select (194) a scheduling assignment pool from a plurality of available scheduling assignment pools for transmission of a scheduling assignment message in response to the determined characteristic of the data message, and transmit (196) the scheduling assignment message in the selected scheduling assignment pool, wherein the scheduling assignment message indicates resources in at least one of a plurality of data pools for transmission of the data message.

Embodiment 37

A radio communication device (110, 120, 2700, 2800) operating in a telecommunications system, wherein the radio communication device is adapted to: determine (192) a characteristic of a data message; select (194) a scheduling assignment pool from a plurality of available scheduling assignment pools for transmission of a scheduling assignment message in response to the determined characteristic of the data message; and transmit (196) the scheduling assignment message in the selected scheduling assignment pool, wherein the scheduling assignment message indicates resources in at least one of a plurality of data pools for transmission of the data message.

Embodiment 38

A method, comprising: performing the following in a radio communication device: receiving (302) a scheduling assignment message on a shared medium during a predefined period that is defined for the transmission of scheduling assignment messages, wherein the scheduling assignment message indicates resources in a plurality of the periodically occurring resource pools for transmission of a data message; and receiving (304) the data message in the identified resources in the plurality of the periodically occurring resource pools.

Embodiment 39

A method, comprising: performing the following in a radio communication device: receiving (312) a first scheduling assignment message on a shared medium in a first scheduling assignment pool that is defined for the transmission of scheduling assignment messages that schedule transmission of data messages having a first characteristic, wherein the first scheduling assignment message indicates resources in one of the periodically occurring resource pools for transmission of a first data message; and receiving (314) a second scheduling assignment message on the shared medium in a second scheduling assignment pool that is defined for the transmission of scheduling assignment messages that schedule transmission of data messages having a second characteristic that is different from the first characteristic, wherein the second scheduling assignment message indicates resources in a second of the periodically occurring resource pools for transmission of a second data message.

Abbreviations

3G Third Generation of Mobile Telecommunications Technology
BSM Basic Safety Message
BW Bandwidth
CAM Cooperative Awareness Message
DPTF Data Packet Transmission Format
D2D Device-to-Device Communication
DENM Decentralized Environmental Notification Message
DSRC Dedicated Short-Range Communications
eNB eNodeB
ETSI European Telecommunications Standards Institute
LTE Long-Term Evolution
NW Network
RS Reference Signals
TF Transport Format
SA Scheduling Assignment
SAE Society of the Automotive Engineers
UE User Equipment
V2I Vehicle-to-Infrastructure
V2P Vehicle-to-Pedestrian
V2V Vehicle-to-vehicle communication
V2x Vehicle-to-anything

FURTHER DEFINITIONS AND EMBODIMENTS

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

What is claimed is:

1. A method of indicating resources in periodically occurring resource pools, the method comprising:
    performing the following in a radio communication device:
    transmitting a scheduling assignment message on a shared medium in a scheduling assignment pool, wherein the scheduling assignment message indicates resources in one of the periodically occurring resource pools for transmission of a data message, wherein the scheduling assignment pool is one of a first scheduling assignment pool or a second scheduling assignment pool different from the first scheduling assignment pool depending on a characteristic of the data message, and wherein the characteristic of the data message is a periodicity of the transmission of the data message.

2. The method of claim 1, further comprising:
    transmitting a first scheduling assignment message on the shared medium in the first scheduling assignment pool, wherein the first scheduling assignment message indicates resources in one of the periodically occurring resource pools for transmission of a first data message, and wherein the first scheduling assignment pool is defined for the transmission of scheduling assignment messages that schedule transmission of data messages having a first characteristic.

3. The method of claim 1, further comprising:
    transmitting a second scheduling assignment message on the shared medium in the second scheduling assignment pool, wherein the second scheduling assignment message indicates resources in a second of the periodically occurring resource pools for transmission of a second data message, and wherein the second scheduling assignment pool is reserved for the transmission of scheduling assignment messages that schedule transmission of data messages having a second characteristic that is different from a first characteristic.

4. The method of claim 1, wherein the characteristic comprises a latency requirement and/or a throughput requirement.

5. The method of claim 1, wherein the first scheduling assignment pool repeats with a first periodicity and the second scheduling assignment pool repeats with a second periodicity that is different from the first periodicity.

6. The method of claim 1, wherein the first scheduling assignment pool comprises a first number of transmission resources and the second scheduling assignment pool comprises a second number of transmission resources that is different from the first number of transmission resources.

7. The method of claim 1, wherein the characteristic comprises a latency requirement and the first scheduling assignment pool is defined for scheduling transmission of data messages with a first latency requirement, and wherein each of the first scheduling assignment pools is followed immediately by one of the periodically occurring resource pools.

8. The method of claim 1, wherein the periodically occurring resource pools, the first scheduling assignment pool, and the second scheduling assignment pool each occupies the same bandwidth and are separated in time.

9. The method of claim 1, wherein the characteristic comprises a latency requirement and the first scheduling assignment pool is defined for scheduling transmission of data messages with a first latency requirement and the second scheduling assignment pool is defined for scheduling transmission of data messages with a second latency requirement.

10. The method of claim 1, wherein the first scheduling assignment pool is defined for transmission of scheduling assignment messages that identify resources for event-driven data messages and the second scheduling assignment pool is defined for transmission of scheduling assignment messages that identify resources for periodic data messages.

11. The method of claim 1, wherein the periodically occurring resource pools and the first scheduling assignment pools each occupies a first bandwidth and are separated in time, and wherein the second scheduling assignment pools overlap in time with both the periodically occurring resource pools and the first scheduling assignment pools, and occupy a second bandwidth that is different from the first bandwidth.

12. A radio communication device comprising:
    a transceiver including a transmitter and a receiver configured to transmit and receive wireless communications; and
    a processor coupled to the transceiver, wherein the processor is configured to perform operations according to claim 1, and wherein the processor is configured to receive wireless communications through the receiver of the transceiver and to transmit wireless communications through the transmitter of the transceiver.

13. A radio communication device, comprising:
    a transceiver including a transmitter and a receiver configured to transmit and receive wireless communications; and
    a processor coupled to the transceiver, wherein the processor is configured to receive wireless communications through the receiver of the transceiver and to transmit wireless communications through the transmitter of the transceiver,
    wherein the processor is configured to transmit a scheduling assignment message on a shared medium in a scheduling assignment pool, wherein the scheduling assignment message indicates resources in one of periodically occurring resource pools for transmission of a data message, wherein the scheduling assignment pool is one of a first scheduling assignment pool or a second scheduling assignment pool that is different from the first scheduling assignment pool depending on a characteristic of the data message, and wherein the characteristic of the data message is a periodicity of the transmission of the data message.

14. A method of selecting a scheduling assignment pool from a plurality of available scheduling assignment pools for transmission of a scheduling assignment message, the method comprising:
performing the following on a radio communication device:
determining a characteristic of a data message, wherein determining the characteristic of the data message comprises determining whether the data message is a periodic data message or an event-driven data message;
selecting the scheduling assignment pool from the plurality of available scheduling assignment pools for transmission of the scheduling assignment message in response to the determined characteristic of the data message; and
transmitting the scheduling assignment message in the selected scheduling assignment pool, wherein the scheduling assignment message indicates resources in at least one of a plurality of data pools for transmission of the data message.

15. The method of claim 14, wherein the scheduling assignment pool is selected according to a rule.

16. The method of claim 14, wherein the plurality of available scheduling assignment pools comprise first scheduling assignment pools and second scheduling assignment pools, and wherein the first scheduling assignment pools are defined for scheduling event-driven data messages and the second scheduling assignment pools are defined for scheduling periodic data messages.

17. The method of claim 14, wherein the plurality of available scheduling assignment pools comprise first scheduling assignment pools and second scheduling assignment pools, wherein the first scheduling assignment pools have a first transmission delay and the second scheduling assignment pools have a second transmission delay that is larger than the first transmission delay, wherein determining the characteristic of the data message further comprises determining a latency requirement of the data message, and wherein the method further comprises comparing the latency requirement of the data message to the first transmission delay and the second transmission delay.

18. A radio communication device, comprising:
a transceiver including a transmitter and a receiver configured to transmit and receive wireless communications; and
a processor coupled to the transceiver, wherein the processor is configured to perform operations according to claim 14, wherein the processor is configured to receive wireless communications through the receiver of the transceiver and to transmit wireless communications through the transmitter of the transceiver.

19. A radio communication device, comprising:
a transceiver including a transmitter and a receiver configured to transmit and receive wireless communications; and
a processor coupled to the transceiver, wherein the processor is configured to receive wireless communications through the receiver of the transceiver and to transmit wireless communications through the transmitter of the transceiver,
wherein the processor is configured to:
determine a characteristic of a data message, wherein the processor is configured to determine the characteristic of the data message by determining whether the data message is a periodic message or an event-driven data message,
select a scheduling assignment pool from a plurality of available scheduling assignment pools for transmission of a scheduling assignment message in response to the determined characteristic of the data message, and
transmit the scheduling assignment message in the selected scheduling assignment pool, and wherein the scheduling assignment message indicates resources in at least one of a plurality of data pools for transmission of the data message.

20. A method, comprising:
performing the following in a radio communication device:
receiving a first scheduling assignment message on a shared medium in a first scheduling assignment pool that is defined for a transmission of scheduling assignment messages that schedule transmission of data messages having a first characteristic, wherein the first scheduling assignment message indicates resources in one of periodically occurring resource pools for transmission of event-driven data messages; and
receiving a second scheduling assignment message on the shared medium in a second scheduling assignment pool that is defined for transmission of scheduling assignment messages that schedule transmission of data messages having a second characteristic that is different from the first characteristic, wherein the second scheduling assignment message indicates resources in a second of the periodically occurring resource pools for transmission of periodic data messages.

* * * * *